Patented Nov. 10, 1925.

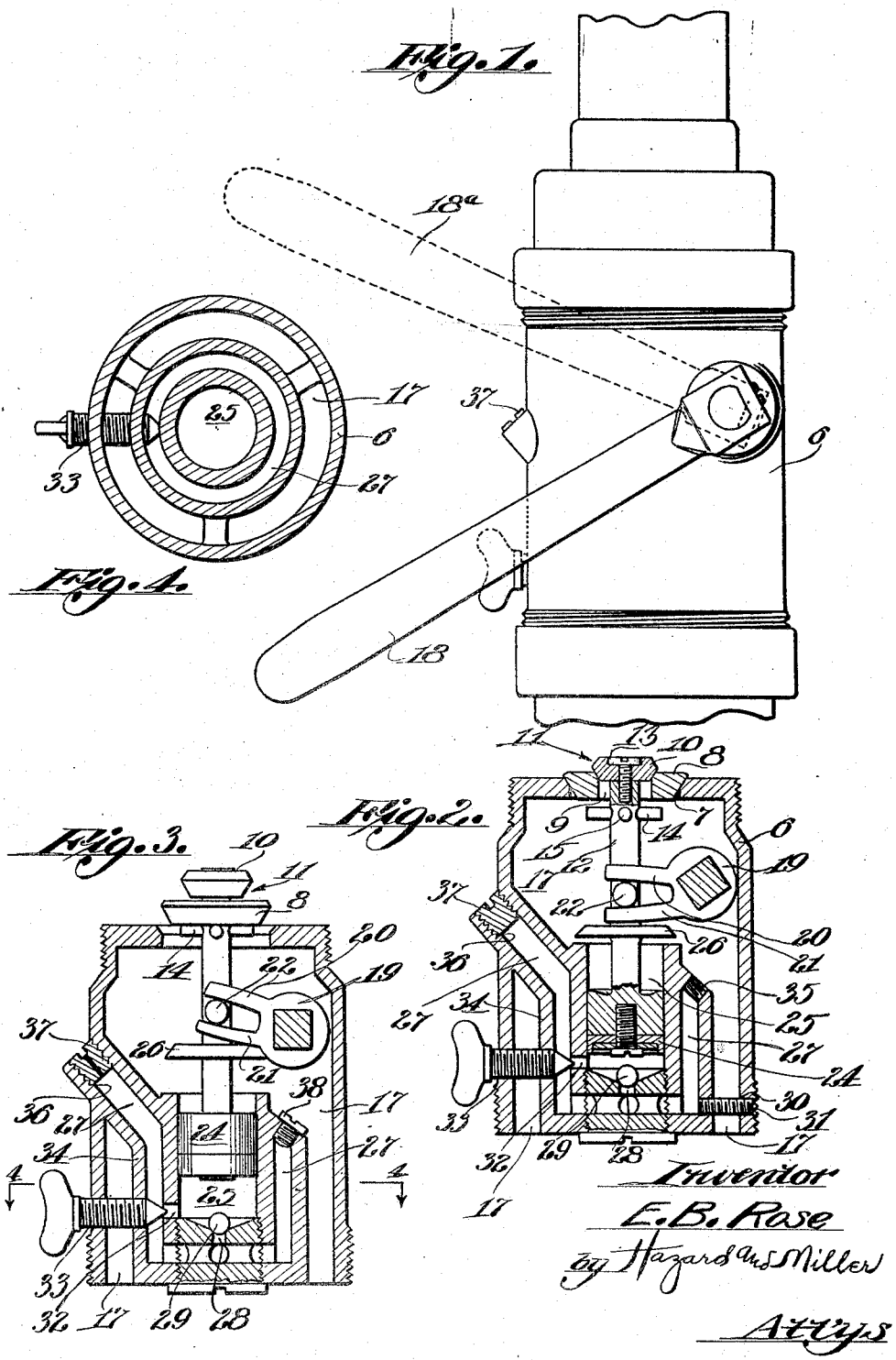

1,560,915

UNITED STATES PATENT OFFICE.

ELIAS B. ROSE, OF LOS ANGELES, CALIFORNIA, ASSIGNOR OF ONE-FOURTH TO WILLIAM J. HOLLENBECK, ONE-TWENTIETH TO GENEVIEVE R. HOLLENBECK, AND ONE-TWENTIETH TO HARRY HELMECHE, ALL OF LOS ANGELES, CALIFORNIA, AND ONE-TWENTIETH TO FRANK H. MARTIN, OF LOS ANGELES, CALIFORNIA.

ADJUSTABLE SELF-CLOSING VALVE.

Application filed January 15, 1924. Serial No. 686,249.

*To all whom it may concern:*

Be it known that I, ELIAS B. ROSE, a citizen of the United States, residing at Los Angeles, in the county of Los Angeles and State of California, have invented new and useful Improvements in Adjustable Self-Closing Valves, of which the following is a specification.

This invention relates to valves, and more particularly it relates to an adjustable self-closing valve which has special application in flushing systems. An object of my invention is to provide mechanism which eliminates the necessity for ordinary flush tanks. Another object of my invention is to provide a self-closing valve which may be operated by comparatively low water pressure. A further object of my invention is to provide a self-closing valve the time interval between the opening and closing of which may be adjusted to any desired degree. A still further object of my invention is to provide an adjustable self-closing valve with such construction that the parts thereof cannot be mechanically affected or injured by the normal pressure of water or other fluids.

With the foregoing objects in view, together with such other objects and advantages as may subsequently appear, this invention resides in the construction and arrangement hereinafter described and claimed and illustrated in the accompanying drawings, in which Figure 1 is an elevational view of a series of pipe lengths within part of which the mechanism of this invention is enclosed and which is operable by the lever shown in Fig. 1.

Figure 2 is a longitudinal section of my device.

Figure 3 is a longitudinal section of a modification of my invention.

Figure 4 is a cross sectional view.

Referring more specifically to the drawings, 6 indicates a tube or pipe section outwardly threaded and partly closed at its upper end and provided with a central aperture 7 on the periphery of which rests a valve 8 which in turn has a central aperture 9 on the periphery of which rests a valve 10; the valves 8 and 10 may be considered as a compound valve and labeled by numeral 11. The valve 10 may be connected to the end of a rod 12 by means of an inset screw 13. The rod 12 is provided with a transverse pin 14 passing through it and secured in any suitable manner against movement sidewise as, for example, by fastening 15. The pin 14 is provided for the purpose of opening valve 8 when it comes in contact therewith by the rising of rod 12 which also operates the valve 10, the opening of these valves being for the purpose of admitting water or other fluid into the chamber 17 of the tube 6. The rod 12 is adapted to be moved by means of a lever 18 shown in Fig. 1 which is secured in any suitable manner to a bifurcated lever 19, the branches 20 and 21 of which extend to opposite sides of a pin 22 which extends from the rod 12, the rod being moved when the forks or prongs 20 and 21 exert a pressure against the pin 22. To the lower end of the rod 12 is affixed a piston head 24 which is adapted to closely fit and reciprocally move in, chamber 25 so that when moved upwardly a partial vacuum may be created below the piston head. The rod 12 is provided with a guard 26 covering the chamber 25 for the purpose of preventing foreign matter from entering the chamber. Surrounding the walls and underneath the bottom of the chamber 25 is positioned a tank 27 which is preferably provided with water or other fluid. The tank 27 is provided with a vertical aperture 28 which opens into the bottom of the chamber 25 and at the top of the aperture 28 a valve 29 is provided which may be opened when the fluid pressure in the tank 27 is greater than the pressure in the chamber 25, which condition arises when the piston head is raised and creates a partial vacuum or reduced pressure.

The chamber 25 is formed by boring from the lower end of the pipe section 6 and a plug is screwed into the lower end of the bore to form the bottom of the chamber 25 and the seat having an aperture 28 for the valve 29.

The tank 27 is provided at its bottom with a drain tube 30 which extends horizontally to the outside of the pipe 6 and is provided with a removable cap 31. This drain pipe is for the purpose of cleaning the tank in the event that a considerable amount of sediment from the fluid used collects in the tank. A side aperture 32 is provided in the tank 27 and opens into the chamber 25 and this aperture is adapted to be made of variable area by any suitable means such as, for example, a needle valve 33 which is threaded into the outer wall 34 of the tank 27 and the wall of the pipe section 6. The tank 27 is provided with an opening 35 into the chamber 17 and also opens through a channel 36 to the exterior of the pipe 6, which latter provision is made for the purpose of facilitating the introduction of water or other fluid into the tank 27. The passage 36 may be closed by a screw plug 37 in order to prevent the introduction of foreign matter therein. The tank 27 may, if desired, contain oil or other fluid; if this fluid is other than water and it is undesirable to contaminate the same with water, the aperture 35 of the tank 27 may be fitted with a screw plug 38 as shown in Fig. 3.

In the operation of the device the pipe section 6 may be made a part of a water pipe by threading it at its upper and lower ends. It will be seen that the compound valve 11 is normally closed and thus prevents water from above entering the chamber 17. When it is desired to flush a system which is connected below the pipe 6, the lever 18 is raised as, for example, to a position 18ª shown in dotted lines in Fig. 1. This movement of the lever 18 causes the prong 21 of the lever 19 to press against the pin 22 on the rod 12 and lifts the rod, thereby opening the valve 10 and allowing water to pass through the aperture 9. By thus opening at first only the aperture 9 a quantity of water is admitted to flow which is not of such great volume that the force of it when falling on the parts of the mechanism will injure the same.

Subsequent to the opening of the valve 10, as the rod 12 continues its upward movement, the transverse pin 14 comes into contact with the bottom of the valve 8 which is lifted from its seat, thereby opening the aperture 7 and allowing a greater volume of water to pass into the chamber 17. The water which flows into the chamber 17 flows into the system below the pipe 6 and accomplishes the flushing action. At the same time that the upward movement of the rod 12 is opening the valve 11, the piston head 24 is being raised and, being tightly fitted into the chamber 25, a partial vacuum is created below the piston head 24. When the pressure in the chamber 25 is thus reduced the hydrostatic pressure in the chamber 27 is sufficiently great to open the valve 29 and allow fluid to pass through the aperture 28 into the chamber 25 below the piston head. The increased volume of fluid which then exists below the piston head in the chamber 25 gradually passes out through the aperture 32 into the chamber 27, its rate of flow being regulated by the position of the valve 33. It will be appreciated that the return of the piston head 24 to normal position will occur only after a certain volume of water has passed out through the aperture 32 into tank 27 and that the valve 11 will not be closed until the piston head 24 returns to its normal position. By such action the closing of the valve 11 is regulated by the rate at which fluid is allowed to flow from the aperture 32 to the chamber 27.

While I have described in detail one embodiment of my invention, it is to be understood that modifications thereof may be devised without departing from the spirit and scope of the invention and it is to be understood that such modifications are included in my invention.

I claim:

1. An adjustable self-closing valve mechanism comprising an outer tube, a compound valve adapted to admit a fluid into said tube or prevent its entrance therein, a tank within said tube, fluid within said tank, a piston chamber within said tank, a piston operating within said chamber and associated with said valve for controlling movement of the same, means for moving said piston and simultaneously opening the parts of said valve in succession and creating a partial vacuum within said piston chamber, an aperture allowing communication between said tank and said piston chamber, said aperture being closed by a valve when a normal pressure exists within said chamber and being adapted to be opened by the pressure of fluid in said tank when the pressure in said chamber is reduced and allowing fluid to pass from said tank into said chamber, a second aperture allowing communication between said chamber and said tank for the outlet of fluid from said chamber back into said tank until the pressure within said chamber is normal, whereupon said valve is automatically closed, said second aperture being adapted to be made variable in area by an adjustable valve.

2. An adjustable self-closing valve comprising an outer tube having one end providing a valve seat and the other end open, a valve closure adapted to seat upon said seat, a tank disposed within said tube, a piston chamber disposed within said tank, a piston reciprocable in said piston chamber and connected to the valve closure, means for lifting the piston and valve closure, a check valve adapted to admit fluid from the tank to the piston chamber, and means permitting fluid to be expelled from the piston chamber into the tank.

3. An adjustable self-closing valve comprising an outer tube having one end providing a valve seat and the other end open, a valve closure adapted to seat upon said seat, a tank disposed within said tube, a piston chamber disposed within said tank, a piston reciprocable in said piston chamber and connected to the valve closure, means for lifting the piston and valve closure, a check valve adapted to admit fluid from the tank to the piston chamber, and adjustable means for permitting fluid to be expelled from the piston chamber into the tank through a wall of the piston chamber.

4. An adjustable self-closing valve comprising an outer tube having one end providing a valve seat and the other end open, a valve closure adapted to seat upon said seat, a tank disposed within said tube, a piston chamber disposed within said tank, said tank forming a closed receptacle about the piston chamber, a piston reciprocable in said piston chamber and connected to the valve closure, means for lifting the piston and valve closure, a check valve adapted to admit fluid from the tank to the piston chamber, means permitting fluid to be expelled from the piston chamber into the tank, and means providing a vent for the tank.

5. An adjustable self-closing valve mechanism comprising an open ended outer tube having one end provided with a valve seat, a valve closure adapted to seat upon said seat, a tank, a piston chamber, a ball check valve permitting fluid to enter said piston chamber from said tank, a piston reciprocable in said tank, a rod connecting said piston and said valve closure whereby said piston and valve closure may be lifted simultaneously, a splash guard mounted upon said rod covering the open end of said piston chamber, and an adjustable outlet permitting fluid to be forced from said piston chamber into the tank.

6. An adjustable self-closing valve comprising an outer tube, means providing a valve seat adjacent one end of the tube, a valve closure adapted to seat upon said seat, a tank disposed within said tube, a piston chamber disposed within said tank, a piston reciprocable in said piston chamber and connected to said valve closure, means for lifting said piston and valve closure, a check valve for admitting fluid from the tank to the piston chamber, there being an outlet aperture formed in the piston chamber through which fluid may be expelled from the piston chamber into the tank.

7. An adjustable self-closing valve comprising an outer tube, means providing a valve seat adjacent one end of the tube, a valve closure adapted to seat upon said seat, a tank disposed within said tube, a piston chamber disposed within said tank, a piston reciprocable in said piston chamber and connected to said valve closure, means for lifting said piston and valve closure, a check valve for admitting fluid from the tank to the piston chamber, there being an outlet aperture formed in the piston chamber through which fluid may be expelled from the piston chamber into the tank, and an adjusting screw extending through the outer tube and tank opposite said aperture.

8. An adjustable self-closing valve comprising an outer tube, means providing a valve seat adjacent one end of the tube, the other end of the tube being open, a valve closure adapted to seat upon said seat, a tank disposed within the tube and supported therein by means of webs, a piston chamber disposed within said tank, a piston reciprocable in said piston chamber and being connected to the valve closure, means for lifting said piston and valve closure, a removable plug closing the bottom of the tank and piston chamber providing a passage whereby fluid may be admitted from the tank to the piston chamber, a check valve for said passage, and means providing an outlet from said piston chamber.

In testimony whereof I have signed my name to this specification.

ELIAS B. ROSE.